(12) United States Patent
Nielsen

(10) Patent No.: US 10,946,598 B2
(45) Date of Patent: Mar. 16, 2021

(54) METHOD OF MANUFACTURING A WIND TURBINE BLADE

(71) Applicant: LM WP PATENT HOLDING A/S, Kolding (DK)

(72) Inventor: Lars Nielsen, Skanderborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 175 days.

(21) Appl. No.: 16/306,690

(22) PCT Filed: Jun. 13, 2017

(86) PCT No.: PCT/EP2017/064402
§ 371 (c)(1),
(2) Date: Dec. 3, 2018

(87) PCT Pub. No.: WO2017/216155
PCT Pub. Date: Dec. 21, 2017

(65) Prior Publication Data
US 2019/0176413 A1    Jun. 13, 2019

(30) Foreign Application Priority Data
Jun. 14, 2016  (EP) .................... 16174361

(51) Int. Cl.
*B29C 70/48* (2006.01)
*B29C 70/54* (2006.01)
(Continued)

(52) U.S. Cl.
CPC .......... *B29C 70/547* (2013.01); *B29C 70/443* (2013.01); *B29C 70/48* (2013.01);
(Continued)

(58) Field of Classification Search
CPC .......... B29C 70/547; B29C 70/548443; B29C 70/48; B29C 70/68; B29C 43/642;
(Continued)

(56) References Cited

U.S. PATENT DOCUMENTS 9,205,602 B2 * 12/2015 Shinoda .............. B29C 43/3642
2017/0001387 A1 * 1/2017 Ostergaard ......... B29D 99/0025

FOREIGN PATENT DOCUMENTS

EP         2620265 A1     7/2013
WO       2015114098 A1    8/2015

OTHER PUBLICATIONS

International Search Report dated Sep. 29, 2017 corresponding to application No. PCT/EP2017/064402.

* cited by examiner

*Primary Examiner* — Aaron R Eastman
*Assistant Examiner* — Maxime M Adjagbe
(74) *Attorney, Agent, or Firm* — Nath, Goldberg & Meyer; Tanya E. Harkins; Jerald L. Meyer

(57) ABSTRACT

In a method for manufacturing a wind turbine blade half shell, a preformed and cured aerodynamic blade shell member 42 of a fibre reinforced resin is provided. A primarily uniaxial fibre material 66 comprising carbon fibre is laid up on a longitudinal inner area 50 of the preformed shell member 42 and then infused with a resin by vacuum-assisted resin transfer moulding (VARTM), where a longitudinal resin inlet channel 80,82 is arranged on a first lateral side 46 and a vacuum channel 86,88 is arranged on a second lateral side 48 of the laid-up fibre material, and the resin is infused in transverse direction from the first to the second lateral side 46,48.

20 Claims, 7 Drawing Sheets

(51) Int. Cl.
- *B29C 70/44* (2006.01)
- *F03D 1/06* (2006.01)
- *B29D 99/00* (2010.01)
- B29L 31/08 (2006.01)
- B29K 105/08 (2006.01)
- B29K 307/04 (2006.01)

(52) U.S. Cl.
CPC ....... *B29D 99/0025* (2013.01); *F03D 1/0675* (2013.01); *B29K 2105/0881* (2013.01); *B29K 2307/04* (2013.01); *B29L 2031/085* (2013.01); *F05B 2230/21* (2013.01); *F05B 2230/31* (2013.01); *F05B 2280/6003* (2013.01); *Y02P 70/50* (2015.11)

(58) Field of Classification Search
CPC ............... B29D 99/0025; F03D 1/0675; B29L 2031/085; B29K 2031/00; B29K 2307/04; Y02P 70/523; Y02E 10/721

See application file for complete search history.

METHOD OF MANUFACTURING A WIND TURBINE BLADE

FIELD OF THE INVENTION

The present invention relates to a method of manufacturing a wind turbine blade portion, a method of manufacturing a wind turbine blade and a wind turbine having at least one wind turbine blade manufactured by said method.

BACKGROUND OF THE INVENTION

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further comprise along at least a part of the longitudinal extent an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or VARTM (vacuum assisted resin transfer moulding) is one method, which is typically employed for manufacturing composite structures, such as wind turbine blades comprising a fibre reinforced matrix material.

During the process of filling the mould, a vacuum, in this connection to be understood as an under-pressure or negative pressure, is generated via vacuum outlets in the mould cavity, whereby liquid polymer is drawn into the mould cavity via the inlet channels in order to fill said mould cavity. From the inlet channels, the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly, this often results in so-called dry spots, i.e. areas with fibre material not being sufficiently impregnated with resin. Thus, dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, the staff have to stand on the vacuum bag. This is not desirable, especially not when the polymer has not hardened, as it can result in deformations in the inserted fibre material and thus in a local weakening of the structure, which can cause for instance buckling effects.

In most cases, the polymer or resin applied is polyester, vinyl ester or epoxy, and the fibre reinforcement is most often based on glass fibres and/or carbon fibres or hybrids comprising carbon fibres and glass fibres.

Often, the composite structures comprise a core material covered with a fibre-reinforced material, such as one or more fibre-reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM, the liquid resin is not drawn into the mould cavity due to a vacuum generated in the mould cavity. Instead, the liquid resin is forced into the mould cavity via an overpressure at the inlet side.

Blades for wind turbines have become continuously longer in the course of time and can now be more than 80 meters long. The impregnation time in connection with manufacturing such blades has increased, as more fibre material has to be impregnated with polymer. Furthermore, the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result, the polymer has to stay liquid for a longer time, normally also resulting in an increase in the curing time.

US 2012/0009070 discloses a method of preparing a wind turbine blade shell member by use of pre-cured fibre-reinforced sheet material. In one embodiment, a step infusion process is described, where individual layers are infused in sequence.

WO 2015/114098 A1 discloses a method of manufacturing a wind turbine blade portion comprising the steps of:
  laying up a primary fibre material in a mould, infusing said material with a primary resin and curing said primary resin in said primary fibre material to form a cured blade element, laying up a secondary fibre material on top of a portion of the cured blade element, infusing said material with a secondary resin and curing said secondary resin in said secondary fibre material to form an integrated reinforced section being a main laminate or spar cap on said cured blade element.

Carbon fibres material and hybrid fibres material are increasingly used in the manufacturing of wind turbine blades in order to obtain the desired stiffness, strength and weight of the blades. When using carbon fibres or hybrid fibre material comprising carbon fibres in a main laminate, absolute alignment of the carbon fibres is extremely important in order to obtain the foreseen structural strength of the main laminate and thereby the wind turbine blade. When infusing laminates such as main laminates with a resin, resin inlet channels, flow barriers and frequently also valves are arranged on top of laid-up fibre material of the laminate. The mentioned elements create dents in the lay-up directly below them when the mould cavity is evacuated. The dents cause misalignment of the fibres resulting in a significant negative impact on the static strength and fatigue performance of the formed laminate.

WO 2015/114098 A1 discloses a method of manufacturing a portion of a wind turbine blade in two steps.

EP 2 620 265 A1 discloses a method for producing fiber-reinforced plastics utilising an upper resin diffusion medium and a lower resin diffusion medium.

It is an object of the present invention to provide a new method for manufacturing wind turbine blades and a portion of wind turbine blades, and which overcomes or ameliorates the disadvantages of the prior art methods in respect of reduced strength and fatigue properties of the blade due to misalignment of carbon fibres in a laminate of the blade or which provides a useful alternative to prior art methods.

SUMMARY OF THE INVENTION

According to an aspect the present invention, a method is provided for manufacturing a portion of a wind turbine blade, especially a blade shell half, said wind turbine blade portion comprising an aerodynamic blade shell member and an integrated longitudinally extending spar cap or main laminate in a predetermined longitudinal area of the shell member, said area having a length and a width defined by a first and a second lateral side, The method comprises the step of:
a. providing a preformed at least substantially cured aerodynamic shell member of a primary resin reinforced by a primary fibre material and having an outer surface and an inner surface
b. arranging a lower resin flow medium on the inner surface of the shell member in a longitudinal portion thereof corresponding at least to the predetermined longitudinal area and extending beyond the first and the second lateral side of the predetermined area
c. laying up layers of a secondary fibre material comprising carbon fibre for the spar cap or main laminate on the resin flow medium in a longitudinal portion thereof corresponding to the predetermined area
d. arranging an upper resin flow medium on the laid-up secondary fibre material so as to extend laterally beyond the first lateral side of the predetermined area and overlap the lower flow medium in a longitudinal overlap zone at the first lateral side
e. arranging a first longitudinal resin inlet channel on the upper and/or the lower resin flow medium laterally outwardly of the first lateral side, and preferably on the upper flow medium in the longitudinal overlap zone at the first lateral side of the predetermined area
f. arranging a first longitudinal vacuum channel on/or above the inner surface of the preformed shell member laterally outwardly of the second lateral side, and preferably on the lower flow medium outwardly of the second lateral side of the predetermined area
g. sealingly arranging a vacuum bag over at least the secondary fibre lay-up, the vacuum channel, the resin inlet channel and the lower and upper resin flow medium to define a mould cavity
h. applying a negative pressure to the mould cavity through to the vacuum channel,
j. supplying a secondary resin to the fibre-reinforcing material in the mould cavity through the resin inlet channel.
k. allowing the resin to cure to form an integrated fibre-reinforced spar cap or main laminate on the blade shell member.

As no elements, such as resin inlet channels, vacuum channels, restriction or barrier means, valves or the like, are arranged on the laid-up secondary fibre material comprising carbon fibres, the risk of misalignment of carbon fibres is at least substantially eliminated and the load-bearing main laminate or spar cap has the desired and foreseen properties.

The longitudinal resin inlet channel in the overlap zone between the upper and lower resin flow medium supply resin to both the upper and lower flow medium due to the permeability of the upper flow medium. The infusion takes place as a transverse infusion in the direction from the first lateral side, at which the longitudinal resin inlet channel is arranged, towards the second lateral side, at which the vacuum channel is arranged. The infusion of the secondary fibre material is promoted by a resin flow front in both the upper and the lower resin flow medium. The permeability of the upper and lower resin flow medium is selected so that it is possible to control the vacuum and supply of resin to the mould cavity so that the transversely moving flow front in the upper and lower resin flow medium and the laid-up secondary fibre material provides for a completely wetting and impregnating of fibre material with resin from both the upper and the lower resin flow medium without dry spots and preferably and advantageously so that the fibre material is only impregnated from below, i.e. from the flow front of the lower resin flow medium adjacent the second lateral side. By impregnating the secondary fibre material from below during the last part of the infusion, it is possible to observe the flow front through a transparent vacuum bag and control the infusion to avoid formation of a dry spot.

The upper resin flow medium can be a mesh of a polymeric material or a fibre mat with open meshes, the fibre mat being a glass fibre, a carbon fibre or a hybrid mat comprising carbon and glass fibre. At present, it is preferred to use one or more polymeric meshes for the upper resin flow medium.

Correspondingly, the lower resin flow medium can be a net of a polymeric material or a fibre mat with open meshes, the fibre mat being a glass fibre, a carbon fibre or a hybrid mat comprising carbon and glass fibre. However, for the lower resin flow medium, a fibre mat or fabric flow medium is preferred as the lower mat is embedded in the blade shell member as an integrated portion thereof.

It is clear that the resin flow medium is a fabric that enhances in-plane flow of resin. Therefore, the medium is also often called a flow-enhancing layer or material. The resin propagates fasted through the resin flow medium than the fibre material layers.

The secondary fibre material is a primarily unidirectional fibre material.

According to an embodiment, the secondary fibre material comprises a hybrid of carbon fibre and any other fibre, especially a hybrid of carbon fibre and glass fibre.

The primary fibre material can be any fibre material or combination of fibre materials. However, at present, it is preferably a fibre material of primarily glass fibre or a hybrid material of carbon and glass fibre.

The primary resin and the secondary resin can be any resin, such as polyester, vinyl ester, epoxy or a hybrid resin.

The method may comprise the step of treating the inner surface of the preformed shell member prior to laying up the lower resin flow medium and the secondary fibre material. The step of treating the surface acts to increase the bonding between the main laminate and the shell member. The step of treating may comprise grinding and/or applying a primer-improving bonding.

According to a further embodiment, a second longitudinal resin inlet channel is arranged in the longitudinal overlap zone at the first lateral side.

Using a second longitudinal resin inlet channel increases the supply of resin to the upper flow medium and thereby also to the laid-up secondary fibre material. As a result, the infusion time may be reduced.

In a further embodiment, an additional longitudinal resin inlet channel is arranged on the lower flow medium laterally outwardly of the overlap zone.

The additional longitudinal resin inlet channel allows for an additional supply of resin especially to the lower flow medium, if needed.

The resin inlet channel(s) can advantageously be placed relatively close to the first lateral side of the predetermined area, such as 30 to 300 mm outwardly of the first lateral side.

Each longitudinal inlet channel is open towards the lower resin flow material and can be a tube or hose with an omega-shaped cross-section.

According to an embodiment, an additional longitudinal vacuum channel is arranged on the inner surface of the preformed shell member laterally outwardly of the first vacuum channel and laterally outwardly of the lower flow medium.

By means of the additional longitudinal vacuum channel arranged on the inner surface of the preformed shell member, it is possible to maintain vacuum in the mould cavity after the first longitudinal vacuum channel arranged on the lower flow medium has been closed or shut off in order to avoid that resin flows into the first vacuum channel.

Each longitudinal vacuum channel is open towards the mould cavity and can be a tube, a so called spiral tube, or hose having a spiral-shaped outer wall.

In a further embodiment of the present invention, the upper flow medium is arranged so as to cover the entire laid-up secondary fibre material except an uncovered longitudinal zone of the laid-up secondary fibre material adjacent to and inwardly of the second lateral side.

Thereby, the speed of the flow front at the upper flow medium is decelerated at the last part of the infusion. The speed of the flow front at the lower flow medium is maintained. As a result, the flow front of the lower flow medium overruns the flow front at the upper flow medium and the last portion of the secondary fibre material is impregnated from below.

The uncovered zone at the second lateral side can have a width of 3-30% of the width of the longitudinal area between the first and second lateral side.

According to an embodiment, the upper flow medium comprises a first lower and a second upper superjacent flow medium layer.

By using two or more superposed flow medium or flow medium layers, such as polymeric meshes, the resin flow rate through the resulting flow medium can be adapted to the specific need.

One of the flow medium layers, especially the lower flow medium layer, can extend further towards the second lateral side than the other of said flow medium fabric layers.

As a result, the flow rate through the flow medium is decelerated at the point where one of the flow medium layers ends and continues at a lower rate.

The mentioned upper flow medium and upper flow medium layers are preferably polymer meshes allowing for a considerable higher flow rate of the resin than the fibre layers.

In a further embodiment, the preformed aerodynamic blade shell member is formed by Resin Transfer Moulding (RTM), especially Vacuum Assisted Resin Transfer Moulding (VARTM).

However the preformed shell member can also be manufactured by prepreg moulding, i.e. by using fibres pre-impregnated with a pre-catalysed resin being solid or near solid at room temperature. The laid-up fibre material is heated whereby the resin becomes liquid and eventually cured.

According to a further embodiment, the inner surface of the preformed aerodynamic shell member is provided with a longitudinal recess corresponding at least essentially to the predetermined longitudinal area and at least portions of the secondary fibre material arranged therein in step d.

The recess can be provided with opposite slightly upwardly and outwardly sloping sidewalls, the angle of sloping being preferably less than 45°, especially between 10° and 30°.

Thereby, a gradual transition is obtained between the opposite walls of the preformed shell member and the integrated main laminate or spar cap, and the risk of stress concentrations is reduced The lay-up of the secondary fibre material may extend laterally beyond the recess and gradually merge with the inner surface of the shell member in order to obtain a smooth transition between the preformed shell member and the formed and integrated main laminate or spar cap.

A peel ply can be arranged between the upper resin flow medium and the secondary fibre material lay-up.

However a peel ply can alternatively be arranged on top of the upper resin flow medium and the longitudinal resin inlet channel on top on the peel ply.

Finally, it is possible not to use any peel ply.

Additionally the present invention provides a method of manufacturing a wind turbine blade comprising:

providing a first blade portion, especially a blade shell half, and providing a second blade portion, especially a blade shell half, at least one of the first and second blade portions being manufactured according to the method according to the invention, and assembling the first and second blade portions to form a wind turbine blade.

The present invention also provides a wind turbine blade portion manufactured according to the method of the present invention Finally, the present invention provides a wind turbine having at least one wind turbine blade manufactured according to the above method.

It is clear that the invention is particularly suited for large structures. Accordingly, the invention preferably relates to wind turbine blades as well as wind turbine blade portions having a total length of at least 30 metres, 40 metres, 45 metres, 50 metres, 55 metres, or 60 metres.

BRIEF DESCRIPTION OF THE FIGURES

The invention is explained in detail below with reference to an embodiment shown in the drawings, in which.

DETAILED DESCRIPTION OF THE INVENTION

Figure 1:
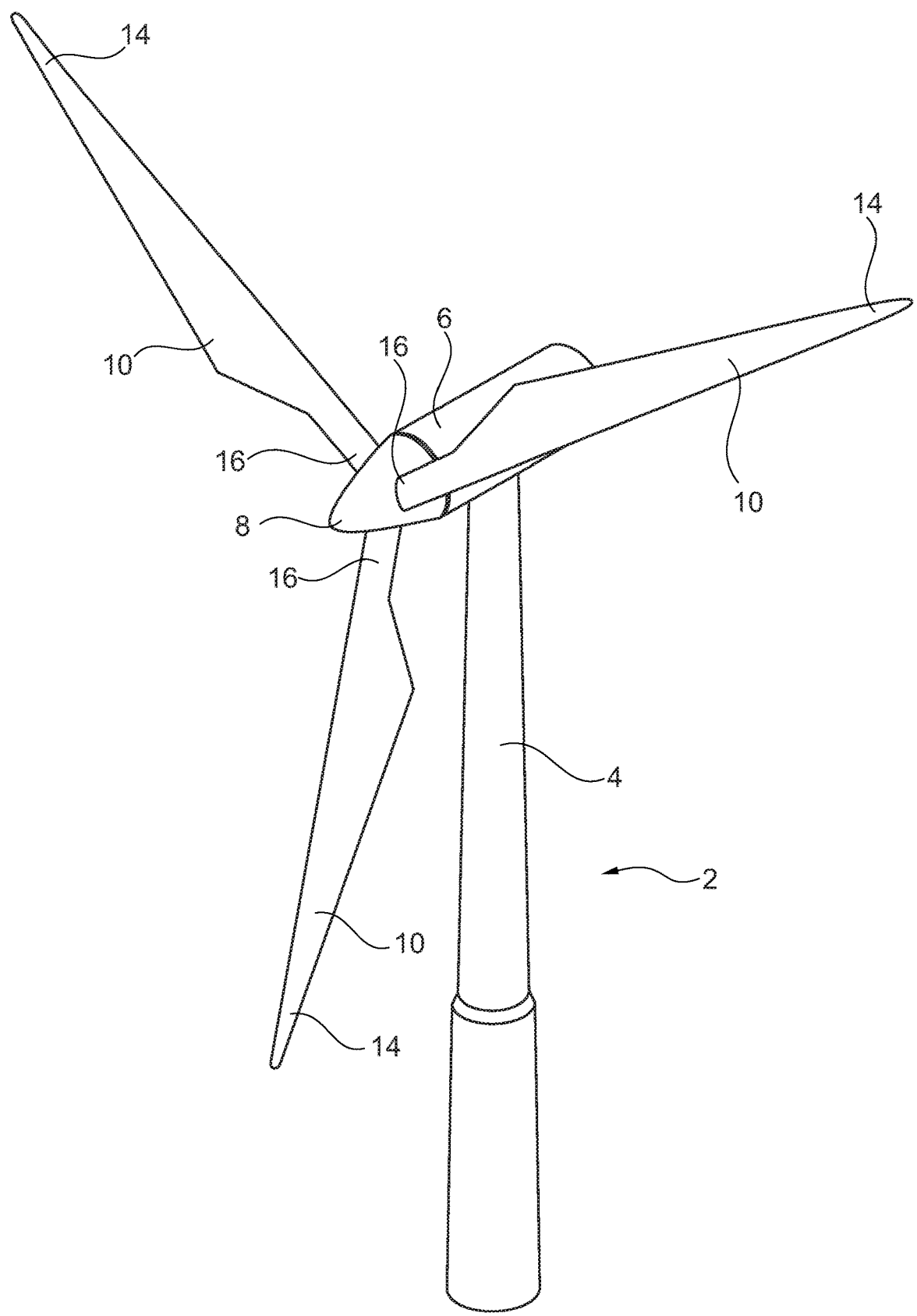
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
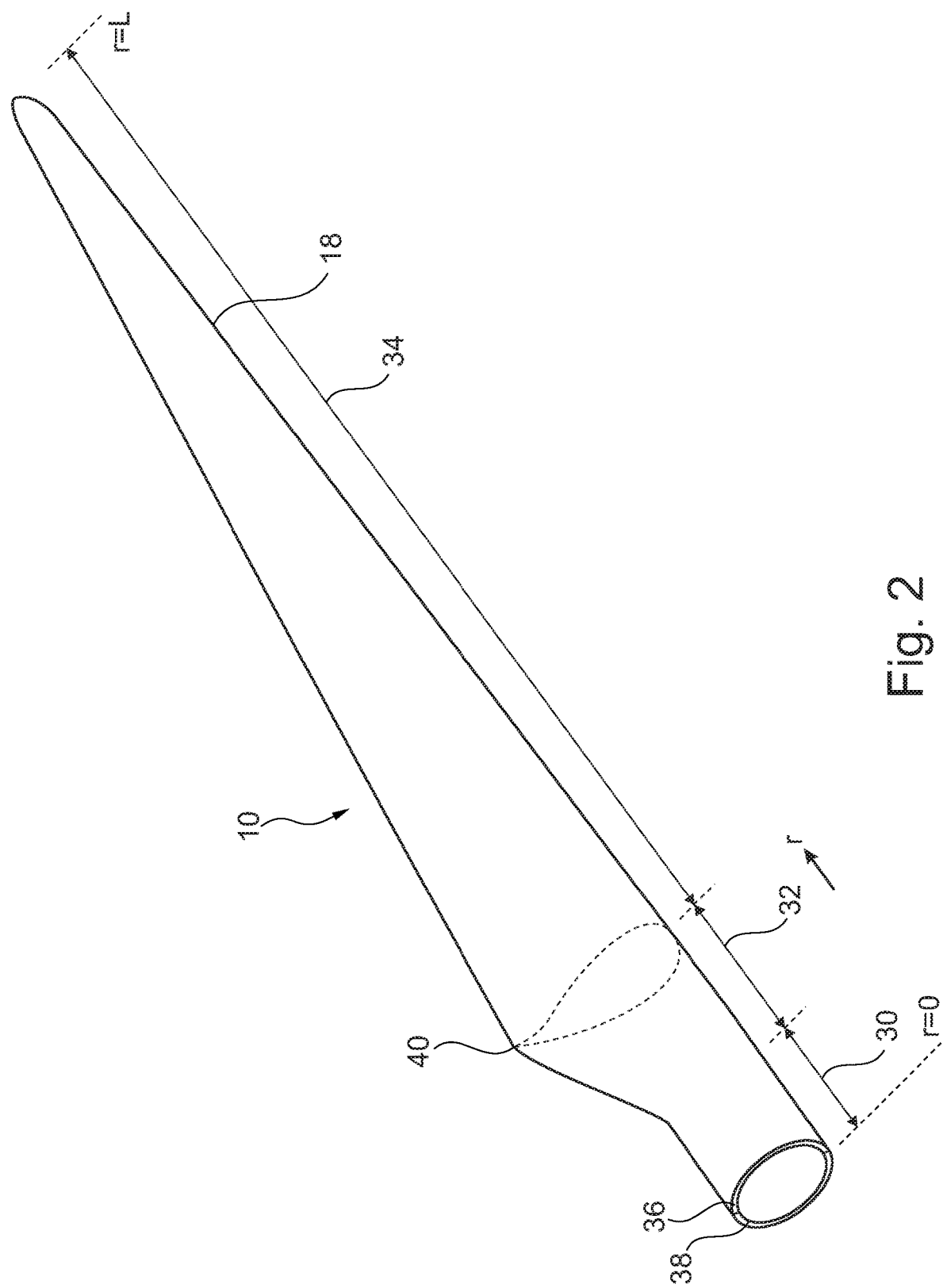
FIG. 2 shows a schematic view of a wind turbine blade manufactured by a method according to the invention.

FIG. 2 is a schematic view of an embodiment of a wind turbine blade 10 manufactured by the method according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34, also called the profiled region, has an ideal or almost ideal blade shape for generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side blade shell half 36 and a suction side blade shell half 38 that are glued to each other along bond lines at the leading edge 18 and the trailing edge of the blade 20.

In the following, the invention is explained with respect to the manufacture of suction side blade shell half 38 shown in FIG. 5 and by reference to FIGS. 3-7. The manufacture of the pressure side blade shell half 36 corresponds essentially to that of the suction side blade shell half 38.

Figure 5:
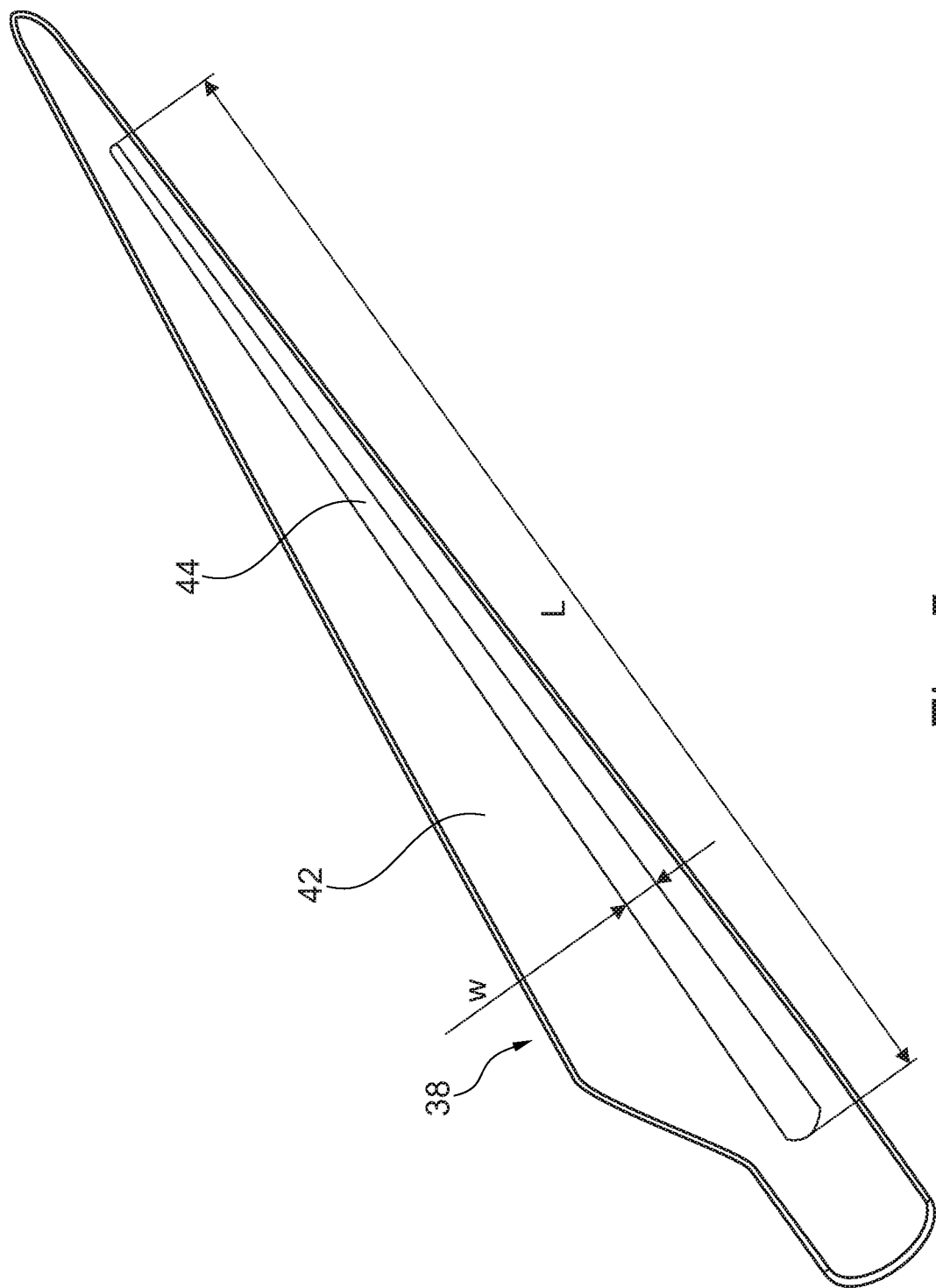
FIG. 5 shows a schematic view of the blade shell portion/blade shell half of FIG. 4 comprising the cured preformed blade shell member and integrated main laminate, FIG. 6 schematically shows an enlarged cross-sectional view corresponding to the central portion of FIG. 4 and illustrating some of the steps of the method according to the invention.

The blade shell half shown in FIG. 5 comprises an aerodynamic blade shell member 42 and an integrated longitudinally extending reinforced section in the form of a main laminate 44 provided in a predetermined longitudinal area 50 of the shell member 42.

The predetermined area has a length L and a width W defined by a first lateral side 46 and a second lateral side 48.

Figure 3:
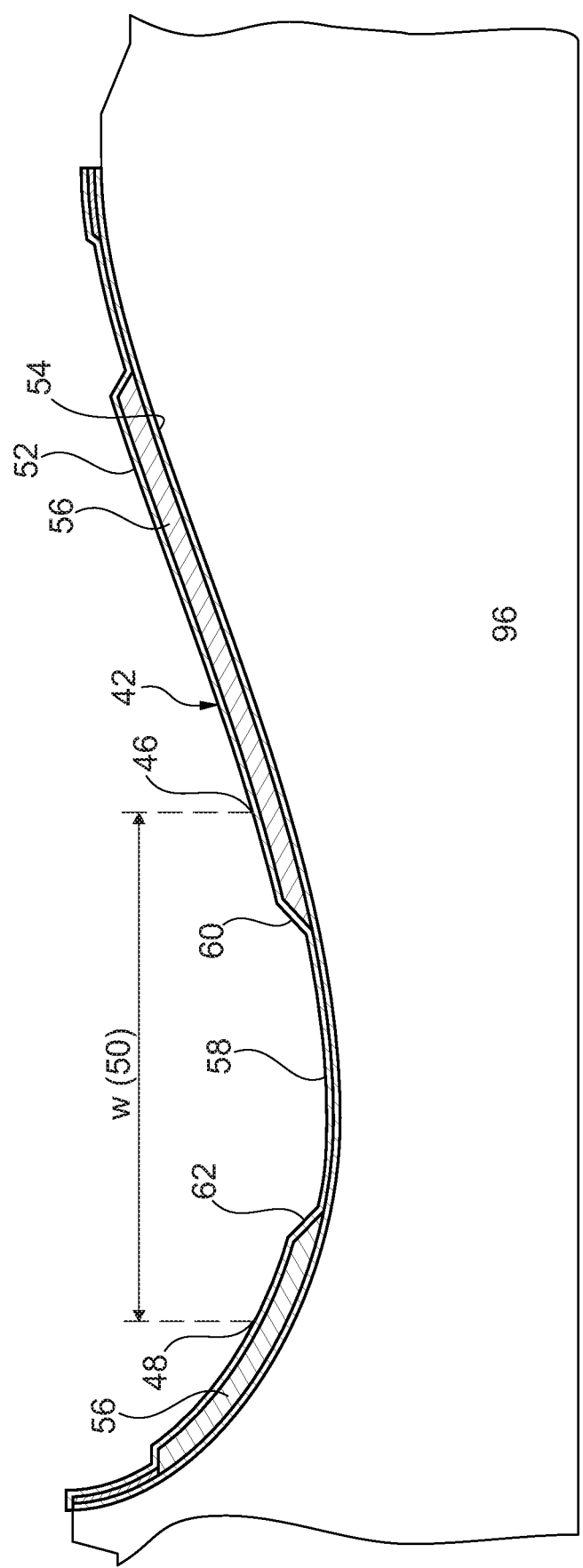
FIG. 3 shows a cross-sectional view of a preformed cured aerodynamic shell member of a primary resin reinforced by a primary fibre material.

According to the invention, the shell member 42 is a preformed at least substantially cured shell member of a primary resin reinforced by a primary fibre material and has an inner surface 52 and an outer surface 54, see FIG. 3, showing a cross-sectional view of the shell member 42 arranged in a lower mould part or support 96. Between two portions of the shell member comprising sandwich core elements 56, the shell member 42 is provided with a longitudinally extending recess or depression 58 in the inner surface 52. The recess 58 has opposite slightly upwardly and outwardly sloping sidewalls 60, 62.

The shell member 42 can be manufactured by vacuum-assisted resin transfer moulding using as the primary fibre material glass fibres and as the primary resin polyester, vinyl ester or epoxy. Alternatively, the preformed shell member can be made of epoxy reinforced by glass fibres by prepreg moulding.

Figure 4:
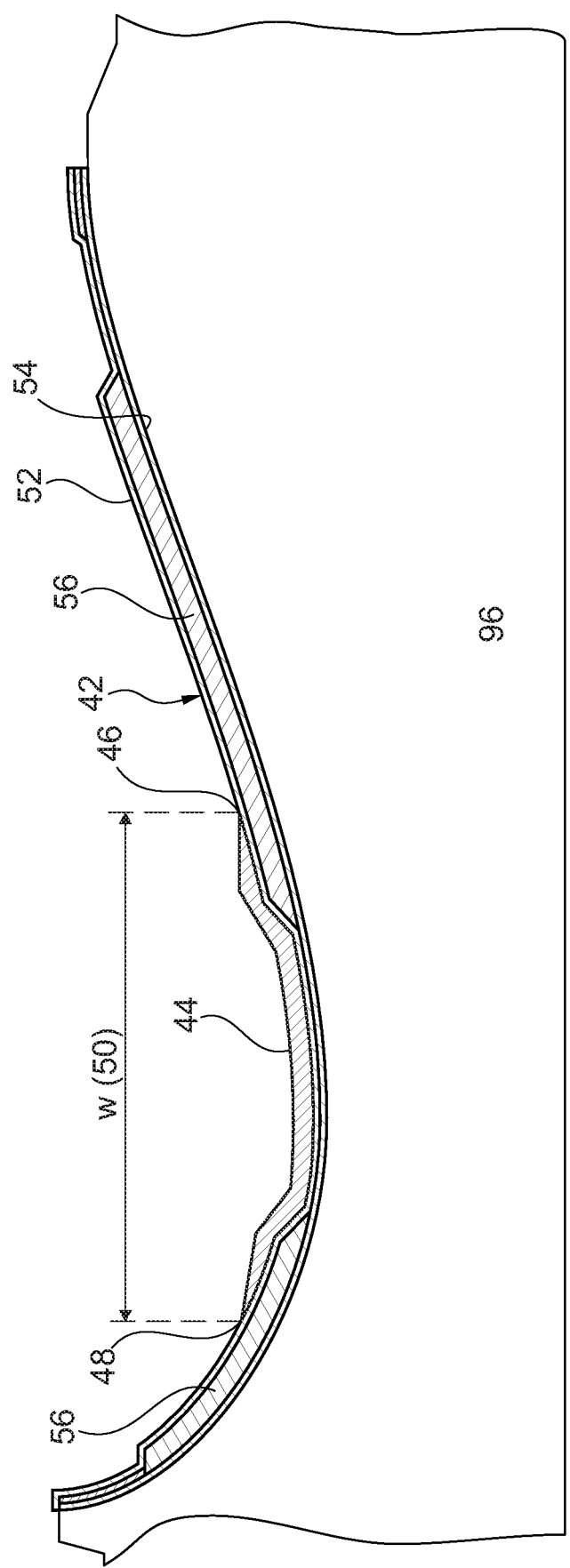
FIG. 4 shows a cross-section of a wind turbine blade portion in the form of a blade shell half manufactured by the method according to the invention and comprising the cured preformed blade shell member of FIG. 3 and an integrated reinforced section in the form of a main laminate comprising a lay-up of secondary fibre material impregnated by a secondary resin by vacuum-assisted resin transfer moulding (VARTM) as described below.

After having provided the above shell member 42, a lay-up of layers of secondary fibre material is arranged in the recess 58 of the shell member 42 and adjacent portions of the adjacent inner surface, i.e. is laid up in the predetermined area 50 defined by the lateral sides 46 and 48. Subsequently, the laid-up secondary fibre material is infused with a secondary resin using VARTM in order to form the integrated longitudinal main laminate 44 as shown in FIG. 4 and as will be described below.

The laid-up layers of the second fibre material comprises primarily unidirectional fibre material layers of primarily carbon fibre or a hybrid of carbon fibre and glass fibre. The secondary resin is preferably polyester or vinyl ester or alternatively epoxy or a hybrid resin.

Prior to arranging the fibre material on the predetermined area 50 of the shell member 42, the area can be treated mechanically, such as by grinding, and/or chemically by applying a primer in order to improve bonding between the secondary resin to the cured primary resin.

In the next step of the manufacturing method, a lower resin flow medium 64 preferably in the form of a resin flow fabric providing a considerably higher resin flow rate than the secondary fibre material is arranged on the inner surface 52 of the preformed shell member 42 in a longitudinal portion thereof corresponding at least to the predetermined longitudinal area 50. Additionally the lower resin flow medium 64 is dimensioned and arranged so as to extend laterally beyond the first lateral side 46 and the second lateral side 48 of the predetermined area 50, see FIG. 6.

Next, the layers of secondary fibre material 66 are laid up on the inner surface 52 of the preformed shell member 42. Both in FIGS. 4 and 6 it can be seen that the lay-up of the secondary fibre material is arranged so as to extend laterally beyond the recess and gradually merge with the inner surface 52 of the preformed shell member 42 in order to obtain a smooth transition between the preformed shell member and main laminate to be formed by said lay-up.

Thereafter, a perforated peel ply 68 is optionally arranged at least on the laid-up secondary fibre material and areas of the inner surface of the preformed shell member adjacent thereto.

Now, an upper resin flow medium 70 is arranged on the laid-up secondary fibre material 66 so as to extend laterally beyond the first lateral side 46 of the predetermined area and overlap the lower flow medium 64 in a longitudinal overlap zone 72. In the present embodiment, the upper flow medium comprises a lower polymeric mesh 74 and a superposed upper polymeric mesh 76. Both meshes have a high permeability so as to provide a high resin flow rate and to supply resin to the lower flow medium 64 in the longitudinal overlap zone 72.

The upper flow medium 70 is arranged so as to cover the entire laid-up secondary fibre material 66 except an uncovered longitudinal zone 78 of the laid up secondary fibre material adjacent to and inwardly of the second lateral side 48.

In the embodiment shown, a first longitudinal resin inlet channel 80 and a second longitudinal channel 82 are arranged on the upper mesh of the upper flow medium 70 in the overlap zone 72 at the first lateral side 46.

Figure 6:
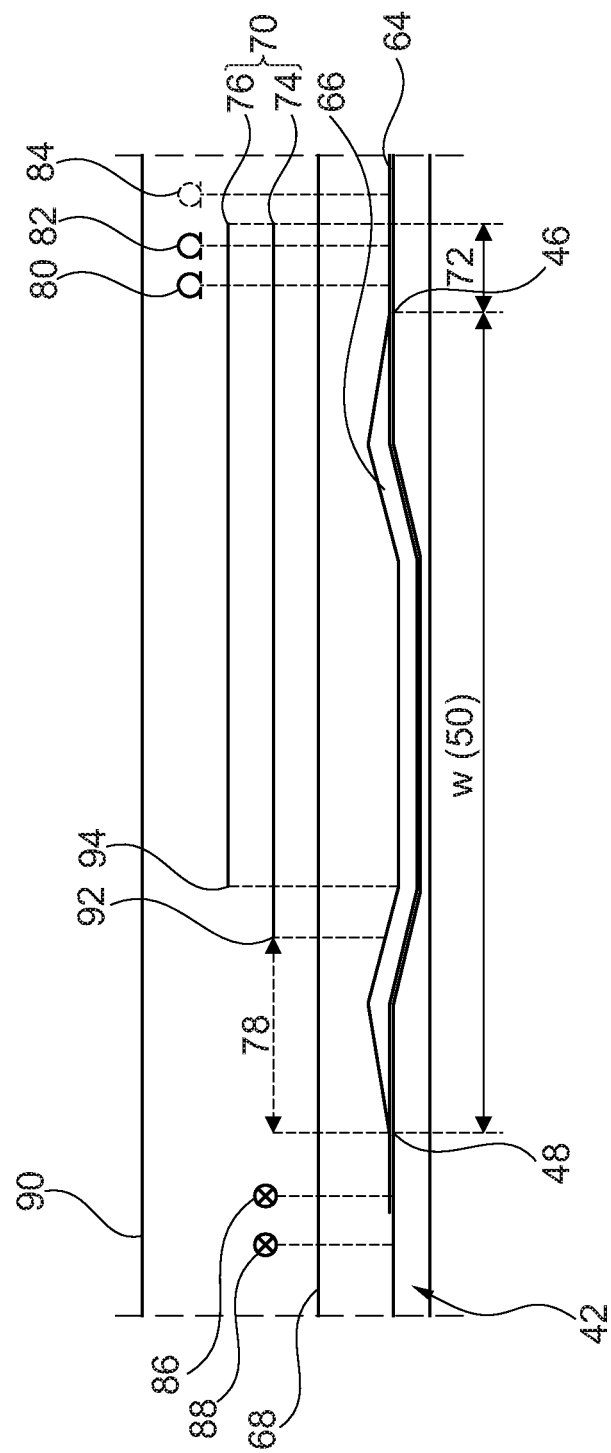

If desired, an additional longitudinal resin inlet channel 84 may be arranged on the lower flow medium laterally outwardly of the overlap zone 72 as indicated in FIG. 6. Each longitudinal resin inlet channel is open towards the subjacent resin flow material and can be a tube or hose with omega-shaped cross section.

Further, a first longitudinal vacuum channel 86 is arranged on the lower flow medium 64 laterally outwardly of the second 2 lateral side 48, and an additional longitudinal vacuum channel 88 is arranged on the inner surface 52 of the preformed shell member 42 laterally outwardly of the first vacuum channel 86 and laterally outwardly of the lower flow medium 64. Any vacuum channel is open towards the mould cavity to be defined by a vacuum bag and can be a perforated tube or a so called spiral tube having a spiral-shaped outer wall.

Finally, a vacuum bag 90 is arranged over at least the laid-up secondary fibre material, the vacuum channels, the resin inlet channels, the upper resin flow medium and the lower resin flow medium and the optional peel ply and sealed to the preformed shell member 42 to form a mould cavity.

The infusion of resin can then take place by supplying vacuum to the mould cavity through the vacuum channels and deliver resin to the mould cavity through the resin inlet channels.

The vacuum created by the longitudinal vacuum channels 86, 88 arranged laterally outwardly of the second lateral side 48 of the longitudinal area 50 will draw resin supplied to the resin inlet channels 80, 82 arranged in the longitudinal overlap zone 72 in transverse direction from the resin inlet channels towards the vacuum channels.

A flow front of resin is formed in both the upper flow medium and the lower flow medium and additionally in intermediate secondary fibre material, the secondary fibre material being impregnated with resin supplied with the resin from both the upper and lower flow medium.

Figure 7:
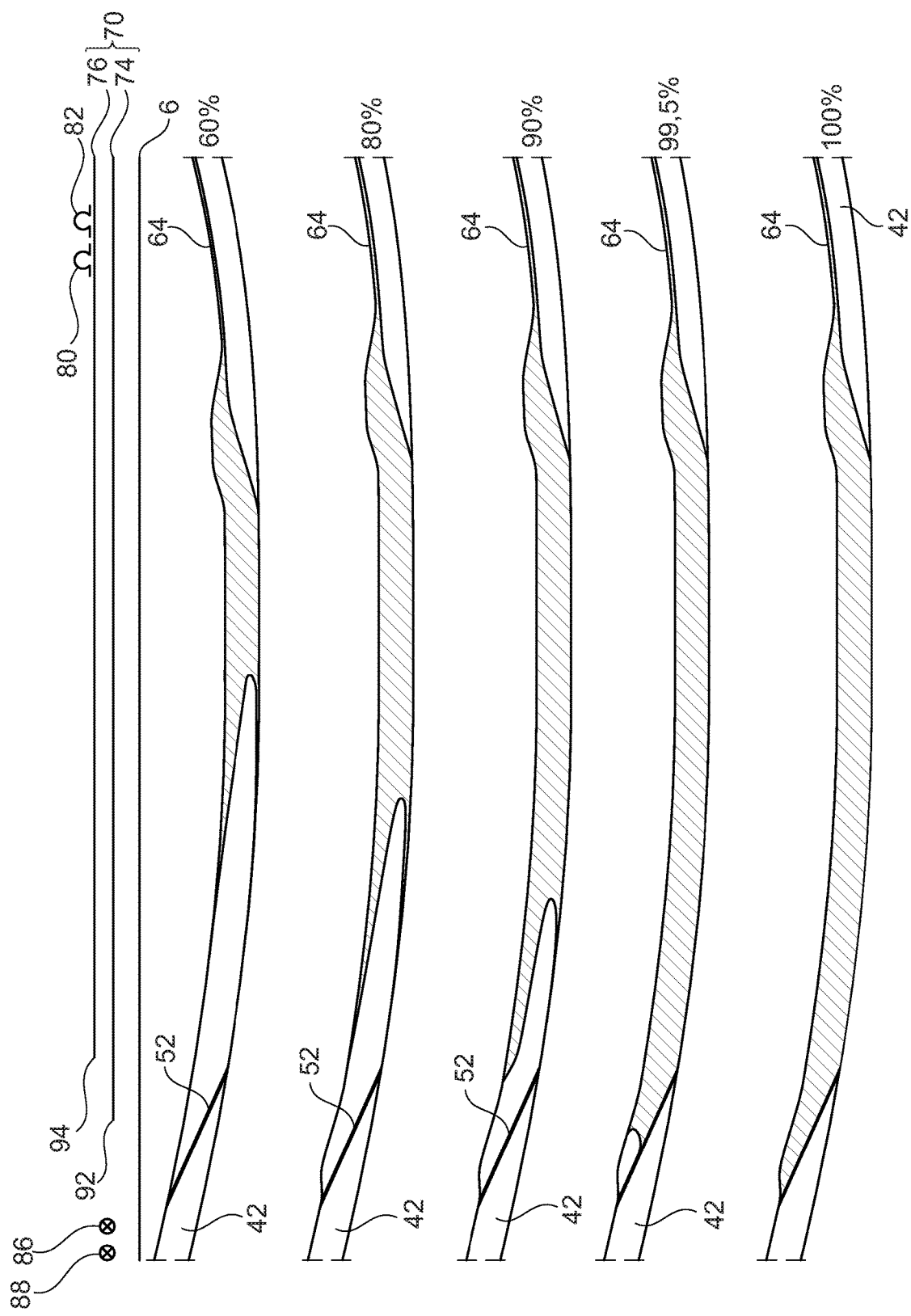
FIG. 7 shows, in cross-sectional view, the steps of filling the mould cavity, i.e. the transverse movement of the resin flow front, during the last 40% of the infusion of the secondary fibre material forming the main laminate.

Reference is now made to FIG. 7 illustrating the movement of the resin flow front by showing a cross-sectional view of the mould cavity when being 60, 80, 90, 99.5 and 100% filled with resin. During the major part of the infusion, the flow front moves faster and is in front of the flow front in the lower flow medium. However, when the resin in the lower and upper mesh 74,76 of the upper flow medium reaches the end 94 of the upper mesh 76 and the end 92 of the lower mesh 74, the movement of the flow front stops in the upper flow medium. This takes place when about 80-90% of the mould cavity has been filled. As a result, the flow front in the upper portion of the fibre material in the longitudinal uncover zone 78 is slowed down and the flow front in the lower flow medium and the adjacent fibre material moves gradually faster than the flow front in the uppermost fibre material in the uncovered zone, catches up with and eventually overruns the latter as illustrated by the illustration of filling the mould cavity to 90, 99.5 and 100%.

After the mould cavity has been filled with resin and the fibre material impregnated with the resin, the resin is allowed to cure. The manufactured blade shell half comprising the preformed shell member with integrated main laminate can then be removed from the lower mould or support. A wind turbine blade is formed by connecting the formed blade shell part with a blade shell half forming the pressure side of the blade.

LIST OF REFERENCE NUMERALS 2 wind turbine
4 tower
6 narcelle
8 hub
10 blade
14 blade tip
16 blade root
18 leading edge
20 trailing edge
30 root region
32 transition region
34 air foil region
36 pressure side
38 suction side
40 shoulder
42 aerodynamic blade shell member
44 main laminate
46 first lateral side
48 second lateral side
50 longitudinal area
52 inner surface
54 outer surface
56 sandwich core element
58 recess
60, 62 opposite slightly sloping walls
64 lower resin flow medium
66 layers of secondary fibre material
68 perforated peel ply
70 upper resin flow medium 72 longitudinal overlap zone
74 lower polymeric mesh
76 lower polymeric mesh
78 uncovered longitudinal zone
80 first longitudinal resin inlet channel
82 second longitudinal resin inlet channel
84 additional longitudinal resin inlet channel
86 first vacuum channel
88 second vacuum channel
90 vacuum bag
92 end of lower mesh
94 end of upper mesh
96 lower mould part or support

The invention claimed is:

1. A method of manufacturing a portion of a wind turbine blade, said wind turbine blade portion comprising an aerodynamic blade shell member and an integrated longitudinally extending spar cap or main laminate in a predetermined longitudinal area of the shell member, said area having a length and a width defined by a first and a second lateral side, the method comprising the steps of:
   a. providing a preformed cured aerodynamic shell member of a primary resin reinforced by a primary fibre material and having an outer surface and an inner surface;
   b. arranging a lower resin flow medium on the inner surface of the shell member in a longitudinal portion thereof corresponding at least to the predetermined longitudinal area and extending beyond the first and the second lateral side of the predetermined area;
   c. laying up layers of a secondary fibre material comprising carbon fibre for the spar cap or main laminate on the lower resin flow medium in a longitudinal portion thereof corresponding to the predetermined area;
   d. arranging an upper resin flow medium on the laid-up secondary fibre material so as to extend laterally beyond the first lateral side of the predetermined area and overlap the lower resin flow medium in a longitudinal overlap zone at the first lateral side;
   e. arranging a first longitudinal resin inlet channel on the upper and/or the lower resin flow medium laterally outwardly of the first lateral side;
   f. arranging a first longitudinal vacuum channel on/or above the inner surface of the preformed shell member laterally outwardly of the second lateral side;
   g. sealingly arranging a vacuum bag over at least the secondary fibre lay-up, the vacuum channel, the resin inlet channel and the lower and upper resin flow medium to define a mould cavity;
   h. applying a negative pressure to the mould cavity through the vacuum channel;
   i. supplying a secondary resin to the fibre-reinforcing material in the mould cavity through the resin inlet channel; and
   j. allowing the secondary resin, the lower resin flow medium and the upper resin flow medium to cure to form an integrated fibre reinforced spar cap or main laminate on the blade shell member.

2. The method according to claim 1, wherein the secondary fibre material comprises a hybrid of carbon fibre and any other fibre, especially a hybrid of carbon fibre and glass fibre.

3. The method according to claim 2, wherein the secondary fibre material comprises a hybrid of carbon fibre and glass fibre.

4. The method according to claim 1, wherein a second longitudinal resin inlet channel is arranged in the longitudinal overlap zone at the first lateral side.

5. The method according to claim 1, wherein an additional longitudinal resin inlet channel is arranged on the lower resin flow medium laterally outwardly of the overlap zone.

6. The method according to claim 1, wherein an additional longitudinal vacuum channel is arranged on the inner surface of the preformed shell member laterally outwardly of the first vacuum channel.

7. The method according to claim 1, wherein the upper flow medium is arranged so as to cover the entire laid-up secondary fibre material except an uncovered longitudinal zone of the laid-up secondary fibre material adjacent to and inwardly of the second lateral side.

8. The method according to claim 7, wherein the uncovered zone at the second lateral side has a width of 3-30% of the width of the longitudinal area between the first and second lateral side.

9. The method according to claim 1, wherein the upper flow medium comprises a first lower and a second upper superjacent flow medium fabric layer.

10. The method according to claim 9, wherein one of said flow medium layers extends further towards the second lateral side than the other of said flow medium fabric layers.

11. The method according to claim 1, wherein the preformed aerodynamic blade shell member is formed by Resin Transfer Moulding (RTM), especially Vacuum Assisted Resin Transfer Moulding (VARTM).

12. The method according to claim 1, wherein the inner surface of the preformed aerodynamic shell member is provided with a longitudinal recess corresponding at least essentially to the predetermined longitudinal area and at least portions of the secondary fibre material arranged therein in step d.

13. The method according to claim 12, wherein the recess is provided with opposite slightly upwardly and outwardly sloping sidewalls.

14. The method according to claim 12, wherein an angle of sloping is less than 45°.

15. The method according to claim 14, wherein the angle of sloping is between 10° and 30°.

16. A method of manufacturing a wind turbine blade comprising:
   providing a first blade portion, especially a blade shell half;
   providing a second blade portion, at least one of the first and second blade portions being manufactured according to the method of claim 1; and
   assembling the first and second blade portions to form a wind turbine blade.

17. A wind turbine having at least one wind turbine blade manufactured according to claim 16.

18. A wind turbine blade portion manufactured according to claim 1.

19. The method according to claim 1, wherein the first longitudinal resin inlet channel is arranged on the upper flow medium in the longitudinal overlap zone at the first lateral side of the predetermined area.

20. The method according to claim 19, wherein the first longitudinal vacuum channel is arranged on the lower resin flow medium outwardly of the second lateral side of the predetermined area.

* * * * *